United States Patent [19]

Baker, Jr.

[11] 3,907,269

[45] Sept. 23, 1975

[54] ROTATING LOCKING WRENCH HOLDER
[75] Inventor: Arthur D. Baker, Jr., Karnes City, Tex.
[73] Assignee: Sioux Steam Cleaner Corporation, Beresford, S. Dak.
[22] Filed: Apr. 18, 1974
[21] Appl. No.: 461,901

[52] U.S. Cl.................. 269/55; 81/5.1 R; 269/96; 269/228
[51] Int. Cl.².................. B23K 37/04; B23Q 3/02
[58] Field of Search............ 269/3, 4, 6, 55, 77, 78, 269/96, 97, 228; 81/5.1 R, 367–380, 428 R

[56] References Cited
UNITED STATES PATENTS
2,660,079  11/1953  Bellows.................. 269/97 X
3,024,018  3/1962  Manz..................... 269/81 X
3,590,669  7/1971  Marasco.................. 81/372

Primary Examiner—Roy Lake
Assistant Examiner—Neil Abrams
Attorney, Agent, or Firm—Merchant, Gould, Smith & Edell

[57] ABSTRACT

A Plier-type locking wrench having an extended adjustment screw received in a bushing that is pivotally mounted in a body having portions disposed to be gripped between the jaws of a vise in a manner to permit rotation of the locking wrench and a workpiece held by the wrench on the axis of the adjustment screw and bushing.

2 Claims, 4 Drawing Figures

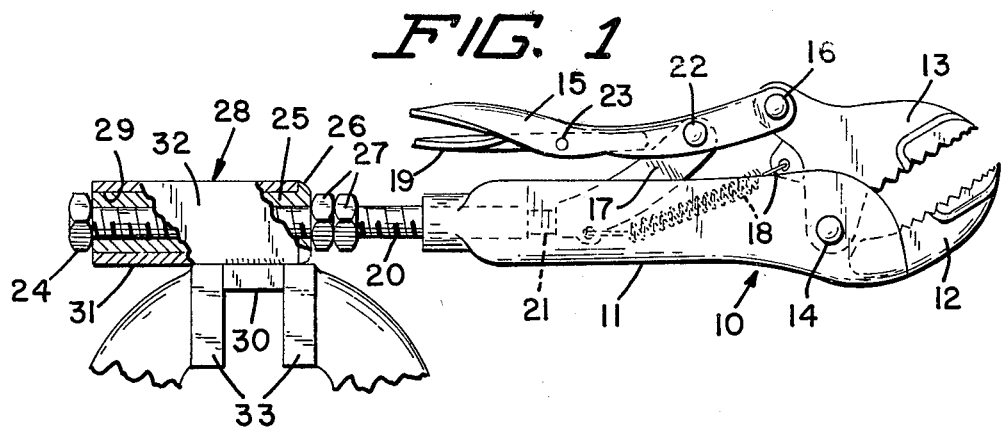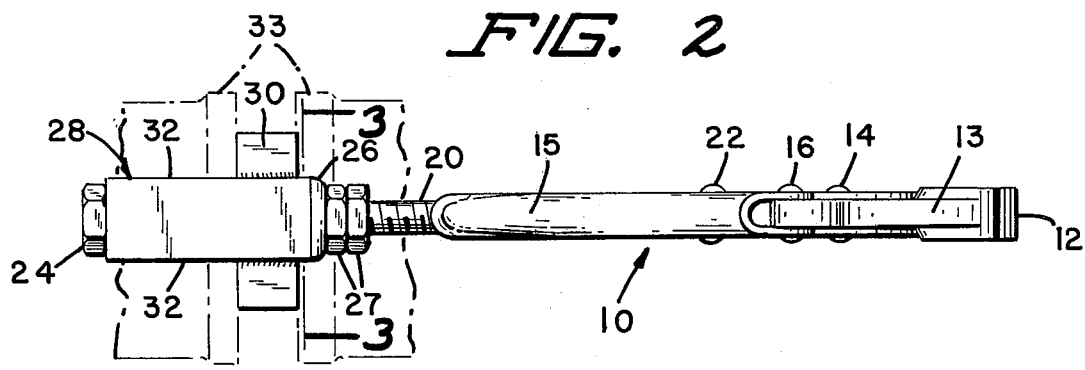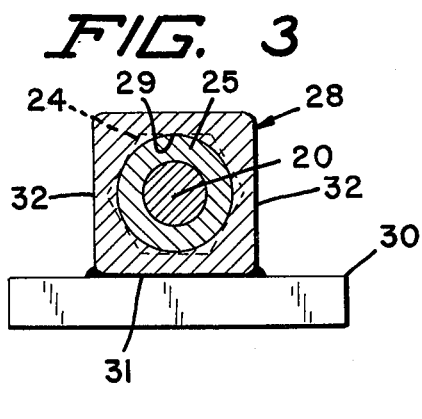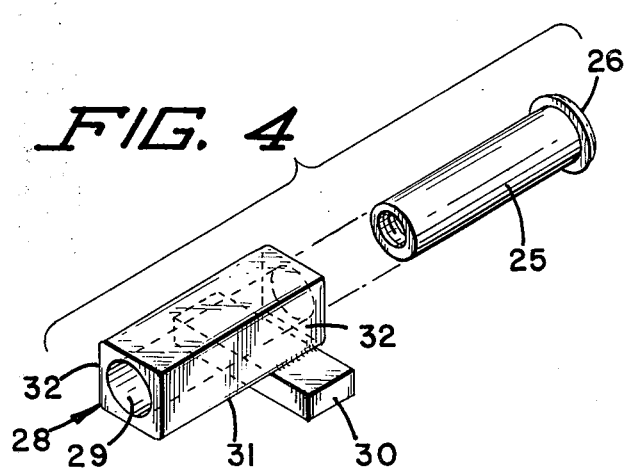

ROTATING LOCKING WRENCH HOLDER

BACKGROUND OF THE INVENTION

This invention relates to devices for holding workpieces for movement during arc welding operations. Locking members and clamps are well known, some being connected to other supporting or clamping devices for the purpose of supporting workpieces in different attitudes. While many of these are satisfactory for adjustably supporting workpieces for various purposes, they are either too expensive to produce for the purpose of satisfactorily conducting a welding current or they are not adapted to the holding of workpieces during a welding operation.

SUMMARY OF THE INVENTION

An important object of this invention is the provision of a workpiece holder which will support a workpiece for rotation during an arc welding operation upon the workpiece, and which will satisfactorily conduct the welding current during such rotation.

Another object of this invention is the provision of a locking wrench and holder therefor, which is simple and inexpensive to produce.

To these ends, I provide a locking wrench of the plier type having an elongated adjustment screw extending longitudinally of a handle of the wrench, an elongated tubular bushing mounted on the adjustment screw outwardly of the handle, and a mounting body having a bore for rotatably receiving the bushing and having a portion disposed to be gripped between the jaws of a vice. The connections between the adjustment screw, bushing and mounting body are such as to provide for adequate current transmission therebetween while permitting the bushing and locking wrench to be rotated relative to the body with little effort.

DESCRIPTION OF THE DRAWINGS

FIG. 1 is a view in side elevation of a rotating locking wrench and holder of this invention mounted in a vise, some parts being broken away and some parts being shown in section;

FIG. 2 is a view in top plan, the portions of a vise being shown by dotted lines;

FIG. 3 is an enlarged transverse section taken on the line 3—3 of FIG. 2; and

FIG. 4 is an exploded perspective of the bushing and mounting body of this invention.

DETAILED DESCRIPTION OF THE PREFERRED EMBODIMENT

In FIGS. 1 and 2, a commercially available and well-known gripping tool or locking wrench is indicated generally at 10. This tool is also commonly known as a vise grip pliers or wrench, and includes an elongated main handle 11 having a fixed jaw 12 rigidly secured thereto, a movable jaw 13 pivotally secured to the main handle 11 by means of a pivot pin or rivet 14, a locking handle 15 pivotally connected at one end to the movable jaw 13 by means of a pivot pin 16, a lever 17, a spring 18, a release lever 19, and an adjustment screw 20. The adjustment screw 20 extends longitudinally of the main handle 11 and is screw threaded therein, so as to be axially movable relative to the handle 11. The adjustment screw 20 has an inner end 21, shown by dotted lines in FIG. 1, which has abutting engagement with the outer end of the lever 17, the inner end of the lever 17 being pivotally secured to the locking handle 15 by a pin or rivet 22, intermediate the opposite ends of the locking handle 15. The spring 18 is of the coil tension type, and has one end secured to the movable jaw 13, and its other end to the lever 17, the spring 18 yieldingly urging the movable jaw 13 in a direction of its pivotal movement away from the fixed jaw 12. The release lever 19 is pivotally mounted, intermediate its ends, to the locking handle 15, as indicated at 23, one end of the release lever engaging the lever 17 to aid in unlocking the locking handle 15 and moving the movable jaw 13 in a jaw open direction away from the fixed jaw 12. Locking wrenches of this type are well-known for their ability to firmly grip and hold a work piece between the jaws 12 and 13.

For the purpose of the present example, the adjustment screw 20 is substantially greater in axial length than similar adjustment screws provided with wrenches of the type shown. The adjustment screw 20 is provided with the usual head 24 at its outer end, and is received in an elongated bushing 25 having a radially outwardly projecting circumferential flange 26 at one end thereof remote from the adjustment screw head 24. The opposite end of the bushing 25 engaging the head 24. A pair of nuts 27 are screw threaded on the adjustment screw 20 intermediate the bushing 25 and wrench handle 11, one of the nuts 27 engaging the flanged end of the bushing 25 to clamp the bushing 25 therebetween and the screw head 24, the other nut 27 being used as a lock nut against the clamping nut.

An elongated cross sectionally rectangular mounting body 28 is provided with a longitudinal bore 29 therethrough for snug rotative reception of the bushing 25 therein. A mounting lug 30 extends transversely of the mounting body 28, and is welded to one side 31 of the mounting body 28, the mounting lug 30 extending laterally outwardly from the planes of opposite sides 32 of the mounting body 28, the sides 32 being adjacent the side 31. As shown in FIGS. 1 and 2, the mounting lug 30 is adapted to be received and gripped by jaws 33 of a conventional vise or fixed clamp, the jaws 33 being shown fragmentarily in FIG. 1, and by dotted lines in FIG. 2. Although not shown, it will be appreciated that any portion of the mounting lug 30 may be gripped between the vise jaws, as may be the mounting body 28.

In use, a workpiece, not shown, is gripped between the jaws 12 and 13 of the locking wrench 10, the mounting lug 30 being firmly gripped between the vise jaws 33. A grounding clamp, not shown, of a conventional arc welding apparatus may be secured to any portion of the vise, after which the welding electrode of the welding apparatus may be applied to the workpiece held by the wrench 10. During the welding operation, the workpiece may be rotated about the axis of the screw 20 and bushing 25 by merely turning the wrench 10. In this manner, a workpiece having different sides to be welded may be easily maneuvered so that the side being welded is always uppermost.

The length of the bushing 25 and mounting body 28 is such that, although the bushing 25 may be fairly easily rotated in the mounting body 28, sufficient metal contact is maintained between the bushing 25 and body 28 to carry the welding current from the workpiece to the grounding plant fixed to the vise without arcing between the several parts.

The head 24 of the adjustment screw 20 is preferably out of size to overlie in part the adjacent end of the mounting body 28, as shown in FIG. 2. Thus, the bushing 25 is held against axial movement in the mounting body 28 in one direction by the flange 26, and in the opposite direction by the screw head 24. In FIG. 4, the bushing 25 is shown as being internally threaded so as to be screw threaded on the adjustment screw 20. However, if desired, the bushing 25 may be provided with a plain axial bore, firm contact being had between the adjustment screw 20 and bushing 25 by means of the adjustment screw head 24 and the nuts 27.

It will be further appreciated that, while the mounting lug 30 is shown as being held in one given position between the vise jaws 33, the lug 30 is capable of being clamped in various positions, any opposite side portions of the lug 30 or mounting body 28 being capable of being clamped between the jaws 33, whereby to dispose the axis of the bushing 25, adjustment screw 20 and wrench handle 11 in any desired direction between vertical and horizontal directions.

While I have shown and described a commercial embodiment of my rotating locking wrench holder, it will be understood that the same is capable of modification, and that modification may be made within the spirit and scope of the invention, as defined in the claims.

What is claimed is:

1. In a locking wrench comprising, a main handle, a relatively stationary jaw on one end of said main handle, a cooperating relatively movable jaw pivotally mounted on said main handle, a locking handle pivotally connected to said relatively movable jaw, a lever having one end pivotally mounted on said locking handle, and an elongated adjustment screw extending longitudinally of said main handle and having an inner end in abutting engagement with the other end of said lever; the combination of supporting means comprising, a bushing mounted on said adjustment screw longitudinally outwardly of said main handle, a cross-sectionally rectangular mounting body having an opening therethrough snugly journaling said bushing, and a mounting lug on said body and extending transversely thereof laterally outwardly with respect to opposite sides of said body, said lug having opposed surfaces disposed to be clamped between the jaws of a vise.

2. The rotating wrench holder defined in claim 1, in which said mounting body is elongated in a direction longitudinally of said adjustment screw and bushing, said mounting lug being secured to said body adjacent one end of the body.

* * * * *